United States Patent [19]
Tanaka

[11] Patent Number: 5,266,931
[45] Date of Patent: Nov. 30, 1993

[54] APPARATUS AND METHOD FOR INPUTTING DATA

[75] Inventor: Hidekazu Tanaka, Tokyo, Japan

[73] Assignee: Sony Corporation, Tokyo, Japan

[21] Appl. No.: 876,473

[22] Filed: Apr. 30, 1992

[30] Foreign Application Priority Data

May 9, 1991 [JP] Japan .................................. 3-133443

[51] Int. Cl.$^5$ .............................................. G09G 3/02
[52] U.S. Cl. ...................................... 345/173; 178/18; 345/156
[58] Field of Search ............... 340/712, 711, 707, 709, 340/706, 700; 178/18, 19; 364/706, 708

[56] References Cited

U.S. PATENT DOCUMENTS

| | | | |
|---|---|---|---|
| 4,716,542 | 12/1987 | Peltz et al. | 340/712 |
| 4,725,694 | 2/1988 | Auer et al. | 340/712 |
| 4,763,356 | 8/1988 | Day, Jr. et al. | 379/368 |
| 5,010,323 | 4/1991 | Hoffman | 340/712 |
| 5,146,049 | 9/1992 | Shima | 178/18 |

*Primary Examiner*—Alvin E. Oberley
*Assistant Examiner*—Xiao M. Wu
*Attorney, Agent, or Firm*—Philip M. Shaw, Jr.; Charles P. Sammut

[57] ABSTRACT

A data input apparatus comprising a pen for selectively indicating and inputting desired data; a display unit for displaying an image of the input data; a tablet for obtaining coordinate data by indicating with the pen the position corresponding to a predetermined portion of a pattern displayed on the display unit; means for detecting the coordinate data in response to a downward press of the pen to the tablet, and further detecting the coordinate data in response to an upward lift of the pen from the tablet; means for setting a first region of a predetermined area in the tablet, and also setting a second region which includes the first region and has an area greater than that of the first region; and deciding means for accepting the input data in response to a downward press of the pen to the first region and thereafter settling the input data in response to an upward lift of the pen from the second region. The apparatus is capable of preventing unintentional cancel of the input data that may result from an accidental displacement of the pen-up region beyond-the pen-down region, hence facilitating accurate input of data to consequently realize faster manipulation.

11 Claims, 7 Drawing Sheets

APPARATUS AND METHOD FOR INPUTTING DATA

BACKGROUND OF THE INVENTION

1. Field of the Invention

The present invention relates to an apparatus and a method for inputting data by utilizing a pattern displayed on the screen of a display unit.

2. Description of the Prior Art

In an attempt to achieve dimensional reduction in a computer or the like, it has been known heretofore to employ an apparatus where a transparent tablet is stuck onto a display screen and, when a pen is brought down to a key-shaped pattern displayed on the screen, a coordinate signal corresponding to the position of the key is generated from the tablet so that the same effect as depression of the key is attained.

FIG. 8 shows an example of such apparatus, wherein the function of an electronic desk calculator is displayed on a screen, and an input accepted in accordance with a downward press of a pen to a button region is settled when the pen is lifted up from the same region. In such an apparatus, when the pen is pressed down to one button position for example, the button is displayed as a reversal image. The input is settled in response to a pen-up action while the displayed image is reversed again to the normal state, and the numerical input or input data to be processed is registered.

In case the input data is to be changed immediately after depressing the button because of an erroneous depression or some other reason, the input can be canceled by dragging the down-position pen to the outside of the button region and then lifting up the pen therefrom.

In such arrangement, the keyboard portion is displayed on the screen merely at the required time, so that it becomes possible to eliminate the necessity of the space for attaching the keyboard, to consequently form the structure in smaller dimensions. Furthermore, upon erroneous button depression or the like, the input data can be immediately canceled without the need of any particular manipulation to eventually enhance the handling convenience.

However, in a small-sized electronic notebook or the like, it is requisite to display individual buttons within a limited region due to the relationship to the display area. Particularly when the apparatus is manipulated fast, there may occur a fault that the pen-up region is deviated from the pen-down region by some shake of the user's hand and so forth. In such a case, the input is canceled contrary to the user's intention for execution of the process, and the same manipulation needs to be repeated.

OBJECT AND SUMMARY OF THE INVENTION

It is an object of the present invention to provide an improvement capable of preventing unintentional cancel of input data that may otherwise result from a deviation of a pen-up region from a pen-down region.

According to one aspect of the present invention, there is provided a data input apparatus which comprises a pen for selectively indicating and inputting desired data; a display unit for displaying an image of the input data; a tablet for obtaining coordinate data by indicating with the pen the position corresponding to a predetermined portion of a pattern displayed on the display unit; means for detecting the coordinate data in response to a downward press of the pen to the tablet, and further detecting the coordinate data in response to an upward lift of the pen from the tablet; means for setting a first region of a predetermined area in the tablet, and also setting a second region which includes the first region and has an area greater than that of the first region; and deciding means for accepting the input data in response to a downward press of the pen to the first region and thereafter settling the input data in response to an upward lift of the pen from the second region.

According to another aspect of the present invention, there is provided a method of inputting data by the use of a pen for selectively indicating and inputting desired data, a display unit for displaying an image of the input data, and a tablet for obtaining coordinate data by indicating with the pen the position corresponding to a predetermined portion of a pattern displayed on the display unit. The method comprises the steps of: detecting the coordinate data in response to a downward press of the pen to the tablet; deciding, in accordance with the result of such detection, that the indication signifies a first region corresponding to the position where a desired key is displayed on the display unit; accepting the input data in response to the result of the decision; deciding that the pen has been lifted up from a second region which includes the first region and has an area greater than that of the first region; and settling the input data in accordance with such decision.

Due to the constitution mentioned, the input data is retained when the pen pressed down to the first region is held within the second region which is wider than the first region, so that if the pen is displaced to the outside of the first region, an unintentional cancel of the input data can be prevented unless the pen is displaced beyond the second region.

The above and other features and advantages of the present invention will become apparent from the following description which will be given with reference to the illustrative accompanying drawings.

DESCRIPTION OF THE PREFERRED EMBODIMENT

Figure 1:
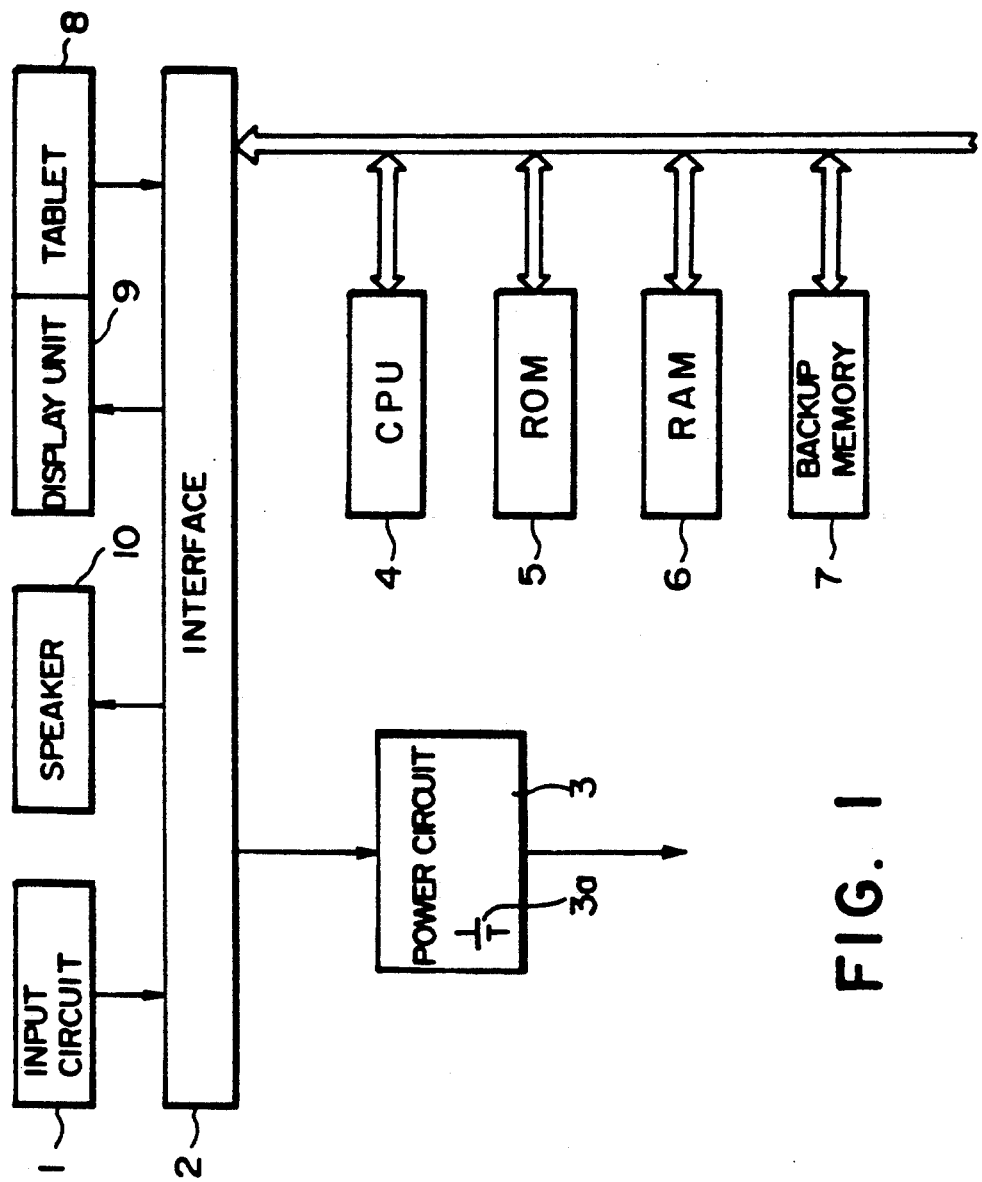
FIG. 1 is a block diagram of an exemplary embodiment representing the data input apparatus of the present invention.

FIG. 1 is a block diagram showing the constitution of an embodiment representing an electronic notebook to which the present invention is applied. In the diagram, an input circuit 1 incorporates a variety of switches including a power switch, and signals for actuating such switches are supplied thereto from a CPU 4 via an interface 2. A DC voltage obtained by rectifying and smoothing an AC power is supplied to a power circuit 3. The power circuit 3 has a battery 3a therein, and a voltage obtained from an AC power source is used as a system operating voltage. In case no voltage is supplied from the AC power source, the voltage obtained from the battery 3a is used as the system operating voltage.

To the interface 2, there are connected a tablet 8, a display unit 9 and a loudspeaker 10. Furthermore the CPU 4, a ROM 5, a RAM 6 and a backup memory 7 are also connected thereto via a bus line.

The tablet 8 is constituted by sticking transparent touch electrodes to a face of the display unit 9, and patterns of buttons or the like visually represented on the display unit 9 are used as input buttons of the tablet 8. When the user touches any pattern such as a button seen through the transparent electrode, a coordinate signal corresponding to the touched portion is supplied to the CPU 4 so that predetermined data is inputted.

In this manner, the tablet is so formed as to generate a coordinate signal corresponding to the portion touched by the user. For generation of such a signal, it is possible to employ either a pressure sensitive type which generates a signal in accordance with a variation in the pressure, or a capacitance type which generates a signal in accordance with a variation in the static capacitance.

Figure 2:
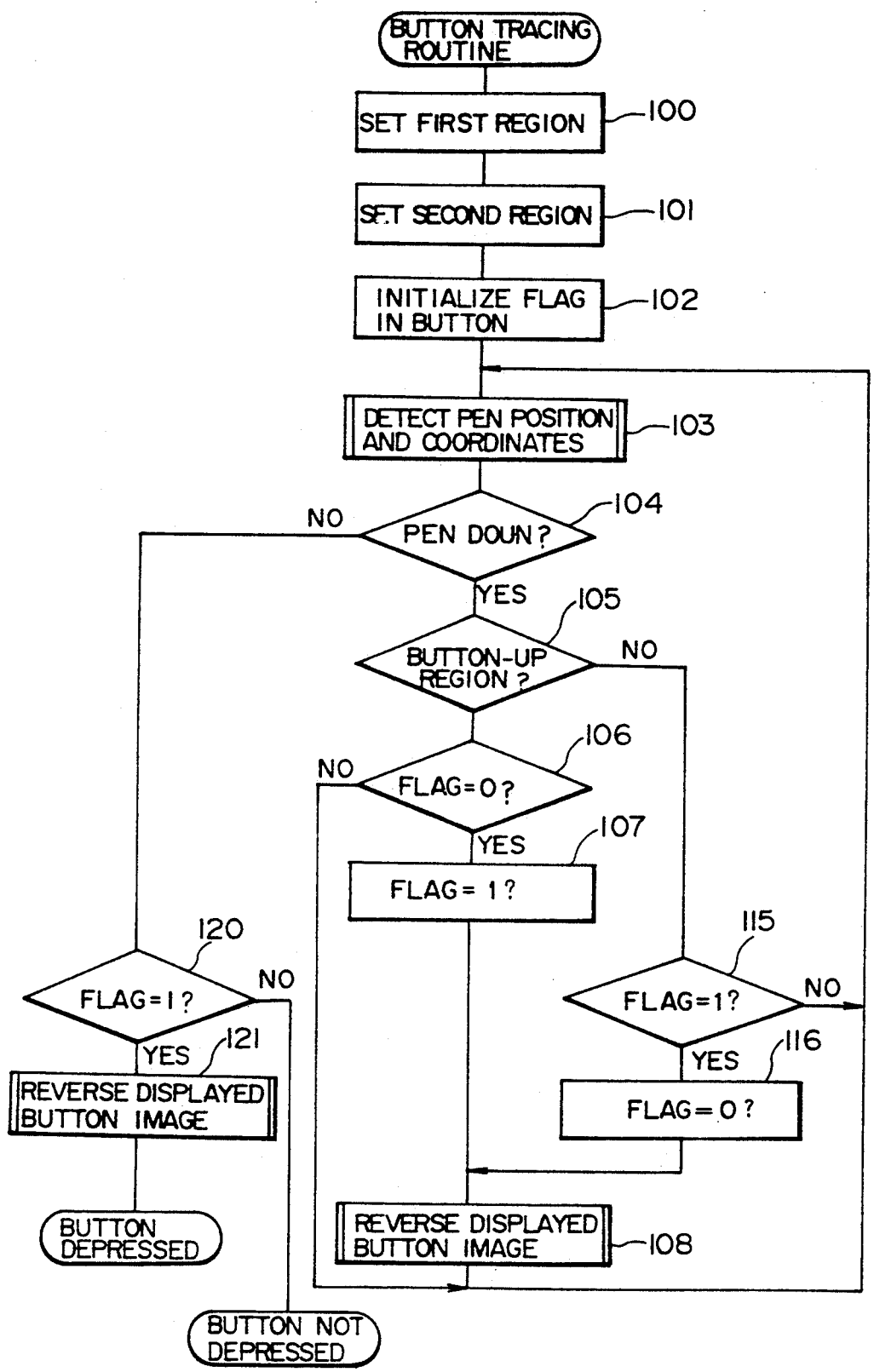
FIG. 2 is a flow chart showing the procedure of an operation performed in the apparatus of FIG. 1.

FIG. 2 is a flow chart showing the procedure of a button tracing operation performed in the apparatus where the present invention is applied. In the process of the flow chart, the operation is started when the pen has been pressed down to a desired button (in an undermentioned first region). As shown at step 100 in FIG. 2, a first region for recognizing a pen-down action is set with respect to the entire buttons, i.e., a display region is set for each button illustrated in FIG. 3. Taking a button "5" here as an example, the first region for this button is substantially rectangular as represented by a thick line in FIG. 4, and is defined by coordinates (x1, Y1) at the upper left corner and coordinates (x2, y2) at the lower right corner.

Figure 5:
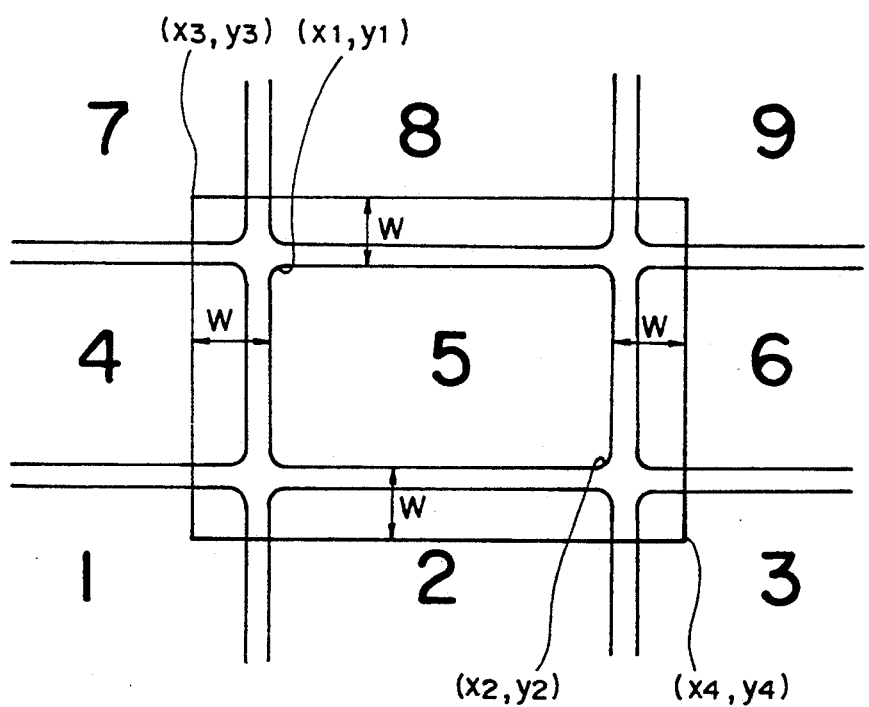
FIG. 5 schematically illustrates a second region.

Subsequently at step 101, a second region for recognizing a pen-up action is set with respect to each of the buttons already set at step 100. As illustrated in FIG. 5, the second region includes the first region and is greater in area than the first region by a width w. The second region is shaped into a substantially rectangular pattern defined by coordinates (x3, y3) at the upper left corner and coordinates (x4, y4) at the lower right corner.

Next at step 102, a flag in each button is initialized (f=0). In this state, a process of accepting a pen-down action is executed at step 103, where a decision is made to discriminate between a pen-down action and a pen-up action, and the coordinates (x, y) thereof are detected. In this case, the coordinates (x, y) are judged to be in which of the button regions set at step 100. (Coordinate detecting means).

The result of the detection at step 103 is decided at step 104. When the result of such decision signifies a pen-down action, a further decision is made at step 105 as to whether the coordinates detected at step 103 are within the pen-up region, i.e., the second region.

If the result of the decision at step 105 signifies that the pen-down coordinates are within the second region, another decision is made as to whether the flag is 0 or not. Since the flag has already been initialized at step 102, the flag is judged here to be 0. Therefore, at step 107, the flag is set to 1.

Then the displayed image of the button in the pen-down region (first region) is turned to a reversal image at step 108, and the operation returns to step 103. The state of the pen at this moment is detected at step 104, and if the pen-down action is continuously maintained, such state is judged at step 104. Thereafter a decision is made at step 105 as to whether the pen is still within the button-up region or not.

Figure 6:
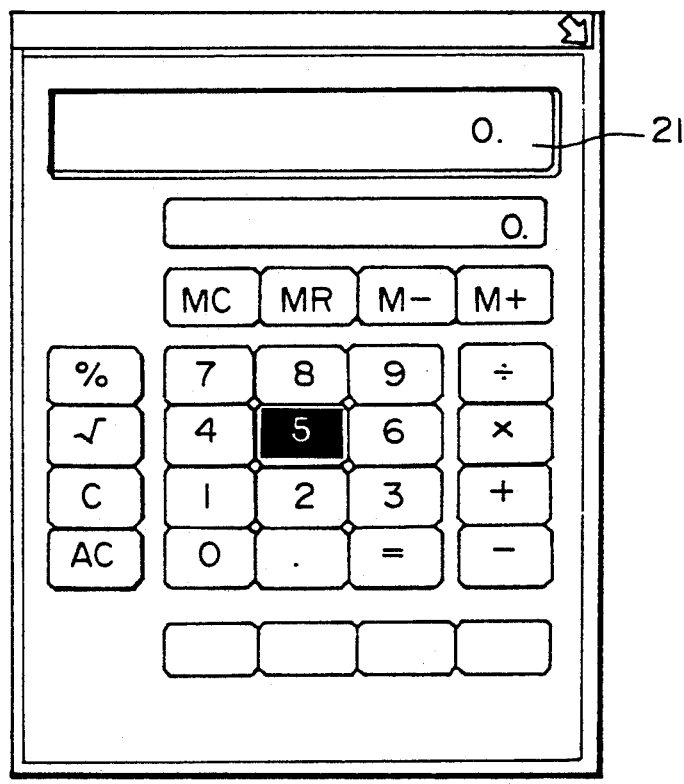
FIG. 6 shows a display state where the pen has been pressed down to a button "5"

FIG. 6 illustrates the displayed content in the stage of the operation mentioned. In this embodiment, there is shown an exemplary state where the button "5" is depressed and displayed as a reversal image.

Subsequently a decision is made at step 106 as to whether the flag is 0 or not. Since the flag has already been set to 1 at step 107, the flag is judged to be not 0 at this time, so that the operations returns to step 103. In this case, the displayed content remains unchanged.

During the continuous pen-down state, if the result of the decision signifies that the coordinates corresponding to the pen-down position at step 105 are outside the button-up region (second region), a further decision is made at step 115 as to whether the flag 1 is 1 or not. Since the flag is 1 at this moment as mentioned, the flag is set to 0 at step 116, and the state of the displayed content is reversed at step 108.

Figure 3:
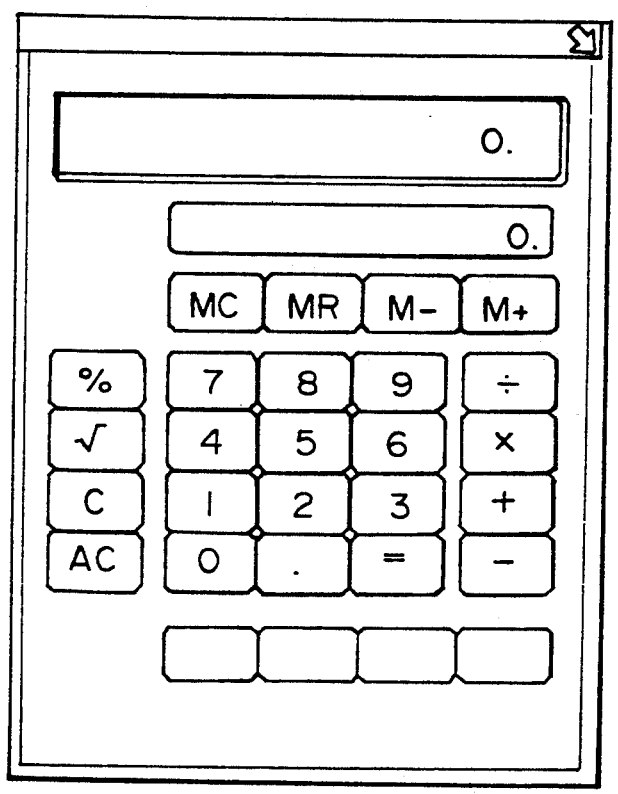
FIG. 3 shows exemplary contents displayed on the screen prior to detection of a pen-down action.
Figure 4:
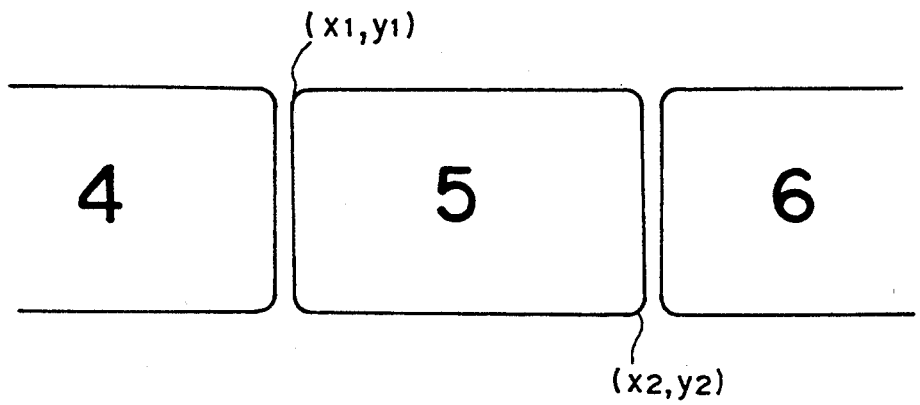
FIG. 4 schematically illustrates a first region.

The displayed content is reversed to the former state of FIG. 3 by clearing the reversal display of the input data. This process is relevant to a manipulation performed when the input data is to be canceled because, for example, the pen was displaced to any position outside the first-depressed button region due to an accidental slip of the user's hand, or the data was inputted by an erroneous depression or the like. Even in such condition, the input of the preceding button can be accepted by reverting the pen from the down-position thereof to the former button-up region (second region).

Upon acceptance of the proper input, the user performs a pen-up action by lifting the pen upward from the tablet. Since the flag is set to 1 at step 107 in case the proper input is accepted, the flag is judged to be 1 at step 120, and then the displayed button is turned to a reversal image at step 121.

Figure 7:
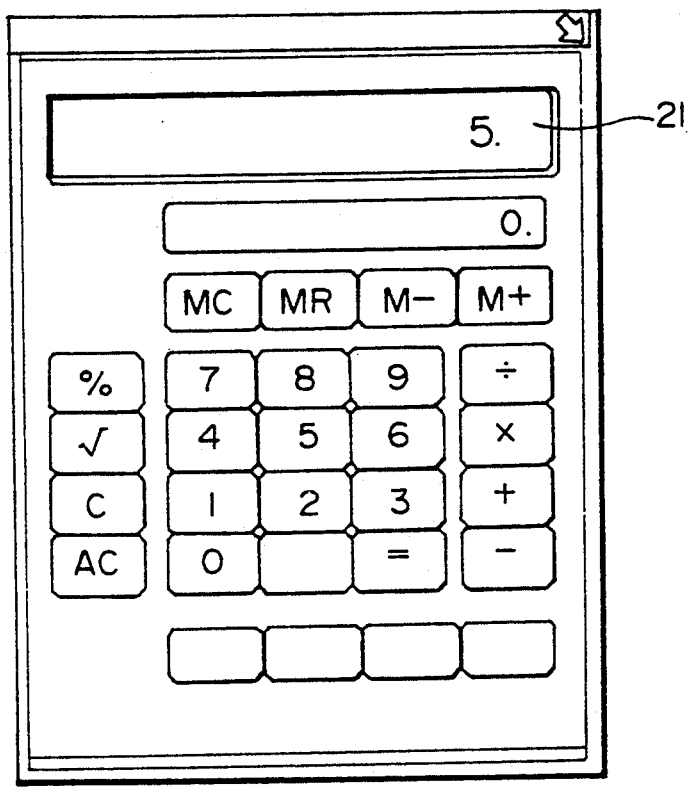
FIG. 7 shows a display state where the accepted input of the button "5" has been settled.
Figure 8:
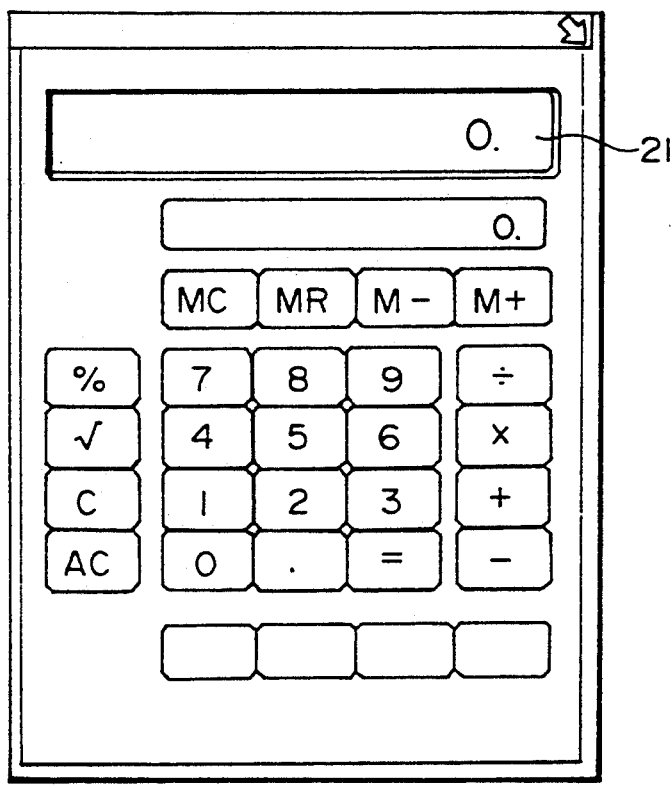
FIG. 8 shows exemplary contents displayed on a screen in a conventional apparatus.

More specifically, the reversal image obtained by the pen-down action is reversed again to the former state, whereby the reversal display is cleared. The depression of the button is recognized through such process and, as shown in FIG. 7, the displayed image of the button "5" is reversed to the former state, while the accepted input data "5" is settled and displayed in the window 21.

Meanwhile, when the pen is shifted to any position outside the second region, the flag is set to 0 at step 116, so that if the pen is lifted up in such a state, the flag is judged to be not 1 at step 120 (deciding means). Accordingly the result of the decision signifies that no button has been depressed at this moment.

The description given above can be summarized as follows.

Upon detection of a pen-down action to the first region of a desired button, a decision is made as to which button has been depressed, and the depressed button (first region) is displayed as a reversal image. In case any wrong button is displayed due to an erroneous depression or insufficient detection precision, the input manipulation can be canceled by first shifting the pen from the down-position to the outside of the second region and then lifting up the pen therefrom.

Even if the pen is accidentally displaced to the outside of the first region by some shake of the user's hand or the like, the selected input is retained effective unless the pen is displaced beyond the second region which is dimensionally greater than the first region. And even when the reversal image of the button is deleted with a displacement to the outside of the second region, the reversal image of the button is displayed again by reverting the pen to the first region while holding the pen in its down-state, whereby the input is accepted.

If the pen is lifted up with the input accepted, the reversal display of the button is deleted, and the input from the button is settled. At this time, even if the pen is positioned outside the first region, the input is processed as effective data unless the pen is further displaced outside the second region, so that there never occurs an unintentional cancel of the input.

According to the present invention, as described hereinabove, the input data is retained, in response to the detection of a pen-down action to a desired pattern, in the area wider than the pen-down region. Therefore, even in an apparatus having a small-sized display device, unintentional cancel of the input is hardly induced to consequently achieve an advantage of facilitating accurate input of data, whereby it is rendered possible to attain faster manipulation of the apparatus.

What is claimed is:

1. A data input apparatus with pen means comprising:
   a pen for selectively indicating and inputting desired data;
   a display unit for displaying an image of the input data;
   a tablet for obtaining coordinate data by indicating with said pen the position corresponding to a predetermined portion of a pattern displayed on said display unit, said tablet being superposed on said display unit in such a manner that the displayed image on said display unit is rendered visible through said tablet;
   means for detecting the coordinate data in response to a downward press of said pen to said tablet, and further detecting the coordinate data in response to an upward lift of said pen from said tablet;
   means for setting a first region of a predetermined area in said tablet, and also setting a second region which includes said first region and has an area greater than that of said first region; and
   deciding means for accepting the input data in response to a downward press of said pen to said first region and thereafter settling said input data in response to an upward lift of said pen from said second region.

2. The apparatus according to claim 1, wherein said deciding means is so formed as not to execute said data settling process if said pen is lifted upward from any position outside said second region after the input data is accepted with the downward press of said pen to said first region, and said means executes a predetermined process without any indication of data by said pen.

3. The apparatus according to claim 1, wherein said predetermined portion is displayed in the shape of a key on said display unit, and said first region is so set as to be equal to said key-shaped portion.

4. The apparatus according to claim 3, further having display control means which controls the display state in such a manner that the displayed image of said key is reversed when said input data is accepted from said deciding means, and is reversed again to the former state when said input data is settled.

5. The apparatus according to any of claims 1 to 3, wherein said apparatus is a small-sized portable computer.

6. A method of inputting data by the use of a pen for selectively indicating and inputting desired data, a display unit for displaying an image of the input data, and a tablet for obtaining coordinate data by indicating with said pen the position corresponding to a predetermined portion of a pattern displayed on said display unit, said method comprising the steps of:
   detecting the coordinate data in response to a downward press of said pen to said tablet;
   deciding, in accordance with the result of such detection, that the indication signifies a first region corresponding to the position where a desired key is displayed on said display unit;
   accepting the input data in response to the result of the decision;
   deciding that said pen has been lifted up from a second region which includes said first region and has an area greater than that of said first region; and
   settling the input data in accordance with such decision.

7. A data input apparatus with pen means comprising:
   a pen for selectively indicating and inputting desired data;
   a display unit for displaying an image of the input data;
   a tablet for obtaining coordinate data by indicating with said pen the position corresponding to a predetermined portion of a pattern displayed on said display unit;
   means for detecting the coordinate data in response to a downward press of said pen to said tablet, and further detecting the coordinate data in response to an upward lift of said pen from said tablet;
   means for setting a first region of a predetermined area in said tablet, and also getting a second region which includes said first region and has an area greater than that of said first region; and
   deciding means for accepting the input data in response to a downward press of said pen to said first region and thereafter confirming said input data in response to an upward lift of said pen from said second region.

8. The apparatus according to claim 3, wherein said tablet is superposed on said display unit in such a manner that the displayed image on said display unit is rendered visible through said tablet.

9. The apparatus according to claim 7, wherein said deciding means is so formed as not to execute said data confirming process if said pen is lifted upward from any position outside said second region after the input data is accepted with the downward press of said pen to said first region, and said means executes a predetermined process without any indication of data by said pen.

10. The apparatus according to claim 7, wherein said predetermine portion is displayed in the shape of a key on said display unit, and said first region is so set as to be equal to said key-shaped portion.

11. The apparatus according to claim 7, further having display control means which controls the display state in such a manner that the displayed image of said key is reversed when said input data is accepted from said deciding means, and is reversed again to the former state when said input data is confirmed.

* * * * *